US00RE50193E

(19) United States
(12) Reissued Patent
Swope et al.

(10) Patent Number: US RE50,193 E
(45) Date of Reissued Patent: Oct. 29, 2024

(54) STRINGED INSTRUMENT VIBRATO TAILPIECE DEVICE AND METHOD

(71) Applicants: Christopher Swope, Overland Park, KS (US); Daniel Dean Falck, Beaverton, OR (US)

(72) Inventors: Christopher Swope, Overland Park, KS (US); Daniel Dean Falck, Beaverton, OR (US)

(21) Appl. No.: 18/218,370

(22) Filed: Jul. 5, 2023

Related U.S. Patent Documents

Reissue of:
(64) Patent No.: 11,056,086
Issued: Jul. 6, 2021
Appl. No.: 16/448,266
Filed: Jun. 21, 2019

U.S. Applications:
(60) Provisional application No. 62/784,931, filed on Dec. 26, 2018, provisional application No. 62/689,155, filed on Jun. 23, 2018.

(51) Int. Cl.
*G10D 3/153* (2020.01)
*G10D 1/08* (2006.01)
*G10D 3/12* (2020.01)

(52) U.S. Cl.
CPC ..... *G10D 1/08* (2013.01); *G10D 3/12* (2013.01); *G10D 3/153* (2020.02)

(58) Field of Classification Search
CPC ..... G10D 3/12; G10D 3/13; G10D 3/147; G10D 3/153; G10D 1/085; G10D 1/08; G10D 1/10
See application file for complete search history.

(56) References Cited

U.S. PATENT DOCUMENTS

| | | | | | |
|---|---|---|---|---|---|
| 2,972,923 | A * | 2/1961 | Fender | G10D 3/153 | 84/307 |
| 3,326,072 | A * | 6/1967 | Price | G10D 3/153 | D17/14 |
| 4,128,033 | A * | 12/1978 | Petillo | G10D 1/08 | 984/118 |
| 4,604,936 | A * | 8/1986 | Page | G10D 3/147 | 984/120 |
| 4,674,389 | A * | 6/1987 | Fender | G10D 3/153 | 84/267 |
| 4,697,493 | A * | 10/1987 | Ralston | G10D 3/153 | 84/313 |
| 4,939,971 | A * | 7/1990 | Satoh | G10D 3/153 | 84/313 |
| 5,429,028 | A * | 7/1995 | Fisher, IV | G10D 3/153 | 84/313 |
| 5,520,082 | A * | 5/1996 | Armstrong | G10D 3/153 | 84/313 |
| 5,808,216 | A * | 9/1998 | Fisher, IV | G10D 3/153 | 84/313 |
| 6,015,945 | A * | 1/2000 | Borisoff | G10D 3/153 | 84/313 |

(Continued)

*Primary Examiner* — Matthew J Kasztejna
(74) *Attorney, Agent, or Firm* — Hovey Williams LLP; Crissa A. Cook

(57) ABSTRACT

Embodiments of the invention are directed to a vibrato tailpiece of a stringed instrument. The present invention provides a mechanism to lower the string plate, fulcrum plate, and vibrato apparatus beneath the base plate and thereby increase the downward pressure of the strings of the stringed instrument against the bridge.

15 Claims, 7 Drawing Sheets

(56) References Cited

U.S. PATENT DOCUMENTS

| | | | | |
|---|---|---|---|---|
| 7,470,841 | B1 * | 12/2008 | McCabe | G10D 3/153 84/312 R |
| 2014/0202307 | A1 * | 7/2014 | Rose | G10D 3/153 84/313 |

* cited by examiner (Amended)

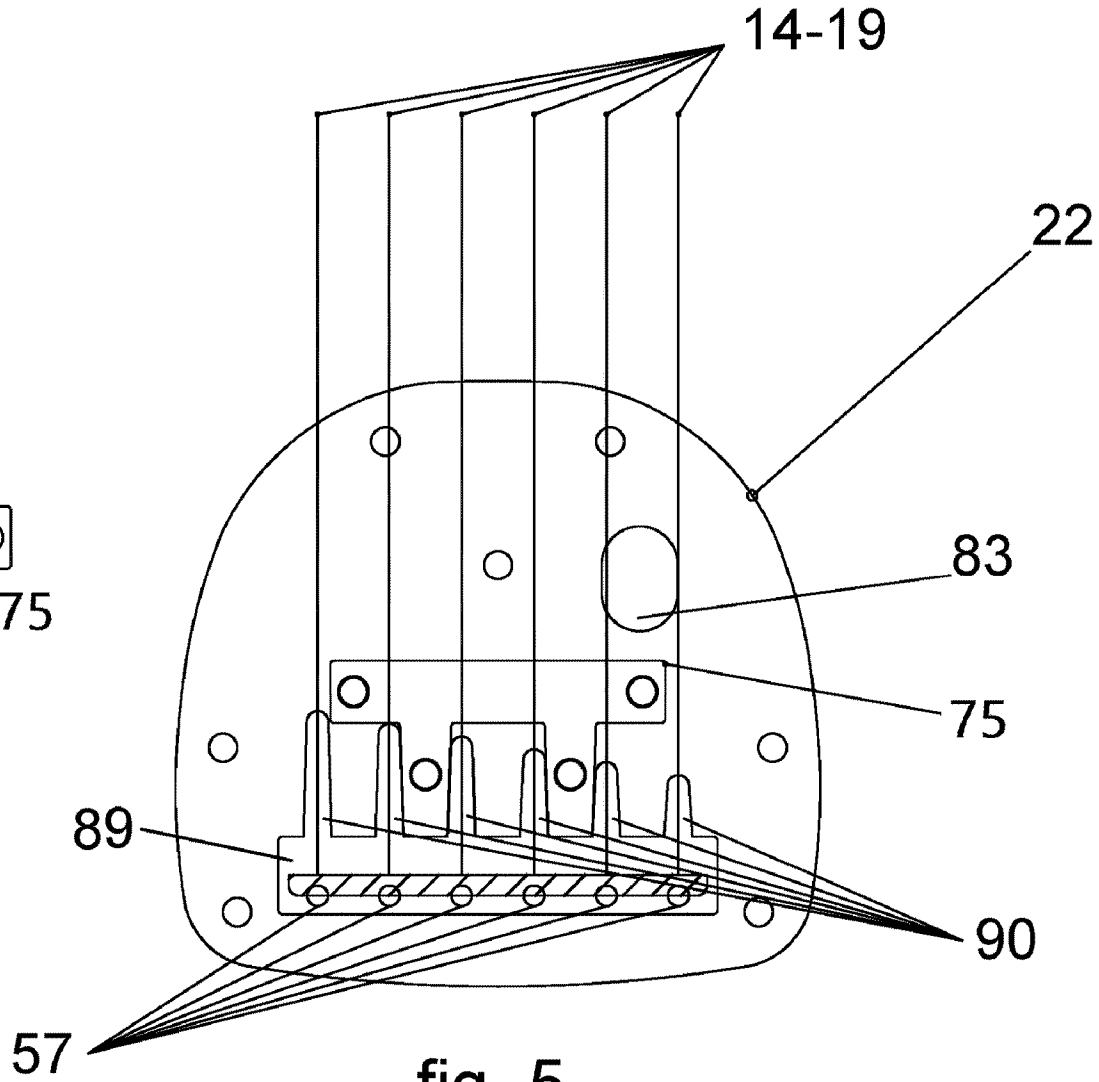
fig. 5
(Amended)
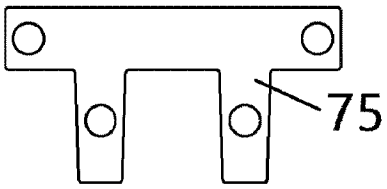
fig. 4
(Amended)

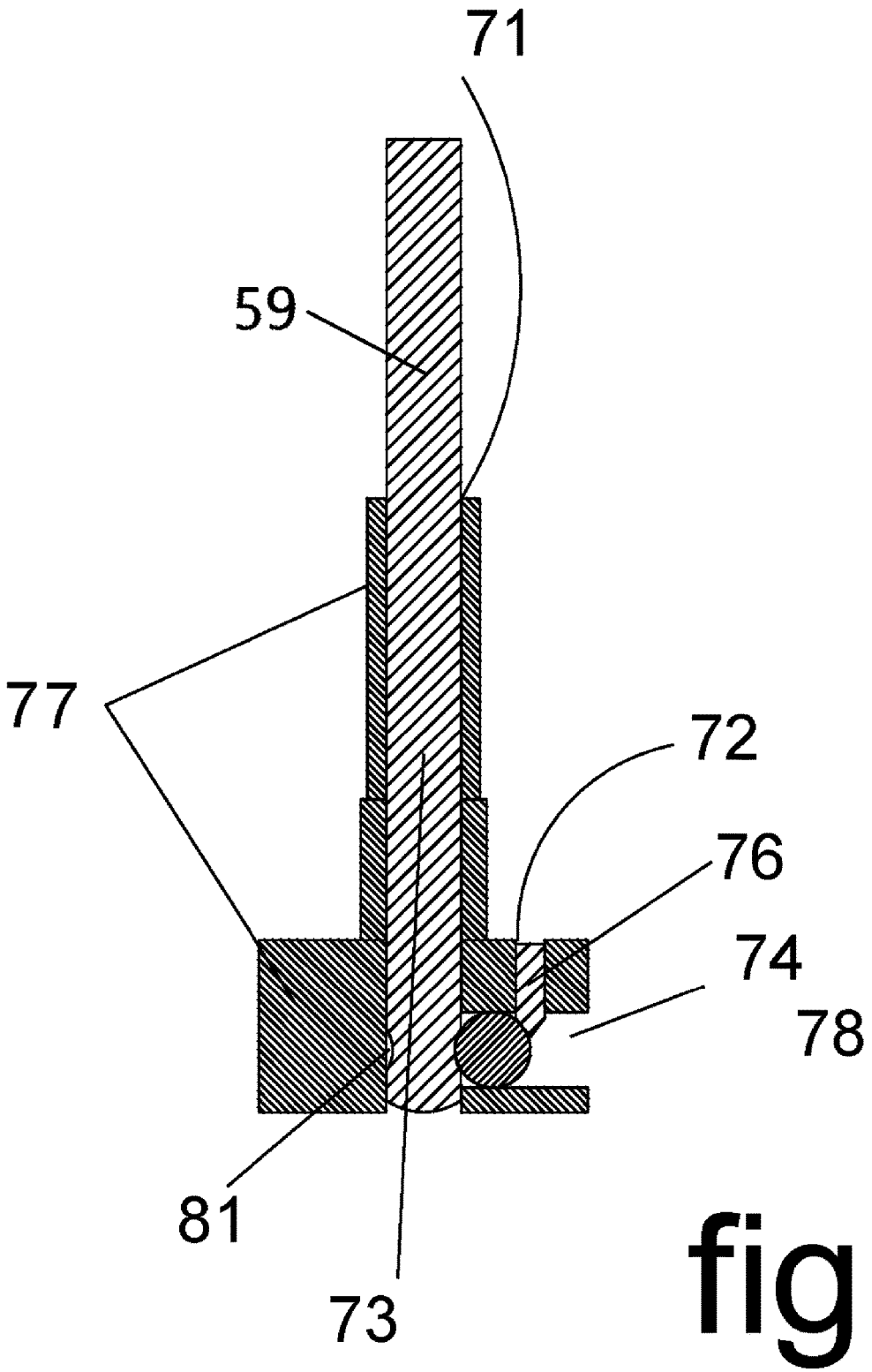
fig. 7
(Amended)

STRINGED INSTRUMENT VIBRATO TAILPIECE DEVICE AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a reissue application of U.S. Pat. No. 11,056,086, which was filed as U.S. patent application Ser. No. 16/448,266 on Jun. 21, 2019, and issued on Jul. 6, 2021, the disclosure of which is hereby incorporated by reference in its entirety, which claims priority to U.S. Provisional Ser. No. 62/784,931, filed Dec. 26, 2018, and U.S. Provisional Ser. No. 62/689,155, filed Jun. 23, 2018.*

BACKGROUND

Aspects of various vibrato tailpieces have developed over time. For example, the 1950's designed (and still in production) vibrato tailpiece, depicted in U.S. Pat. No. 2,972,923, employs a string plate that has the ball end of the strings mounted above the plane of the guitar's body. The length from the instrument's bridge and the tailpiece is such that the string angle from the tailpiece to the bridge is quite shallow. The amount of downward pressure on the bridge saddles is much less than other types of vibrato tailpiece designs and problems occur as a result. These problems include 1) strings popping out of the saddles when strings are bent for pitch change or musical effect, or by users that have an aggressive playing style, 2) poor sustain and sympathetic vibrations from all the movable parts of the bridge due to not enough downward pressure on the string saddle, and 3) intonation issues with the instrument's pivot bridge getting stuck in the forward or backward rocking position, also due to insufficient downward pressure.

Present day users employ much lighter gauge strings than the unit was designed for, favor lower string action, and employ more aggressive styles of playing, all of which exacerbate the above stated problems. Aftermarket tension bars, which mount above the plate and near the bridge to increase downward pressure, are a poor fix that creates an additional and unnecessary friction point, negatively effects the feel of the spring motion and smoothness of the vibrato arm movement, and impedes the ability of the user to pluck the strings behind the bridge, which is a unique and desired feature of this style of vibrato unit for many users. Presently there is no means to lower the actual vibrato mechanism to increase the downward pressure of the strings at the bridge with this common vibrato design.

Further, the original 1950s unit had no means to adjust the tension of the vibrato arm. It was simply a bent rod that was pushed into a collet. As a unit would experience more use the grip from the collet would get looser and looser and the vibrato arm would swing freely once the player took his/her hand off of the vibrato arm. While some other styles of vibrato units feature a means to regulate the rotational movement of the vibrato arm, the particular construction of this 1950s unit prevents those designs from being employed without taking off the guitar strings and removing the entire assembly from the instrument each time an adjustment needs to be made.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, this disclosure describes, among other things a vibrato component for a stringed instrument. In further aspects, the present invention relates to an improvement on stringed instrument vibrato tailpieces. The unit is lowered by a mechanism placed between the base plate and the fulcrum plate. Additionally, slots are cut in the base plate along each string line so that as the string plate lowers the strings can pass through the plane of the base plate with no interference, according to embodiments of the invention. In further aspects, the invention is directed to an optimized vibrato tailpiece mechanism and a method of implementing the optimized vibrato tailpiece mechanism in a stringed instrument.

DESCRIPTION OF THE DRAWINGS

Illustrative embodiments of the invention are described in detail below with reference to the attached drawing figures, wherein:

FIG. 4 is an illustration of a shim for use in one aspect of the invention;

FIG. 5 represents a modified base plate according to aspects of the invention;

FIG. 7 illustrates a cross section of a vibrato arm housing according to yet another aspect of the present invention;

DETAILED DESCRIPTION

The subject matter of embodiments of the invention is described with specificity herein to meet statutory requirements. But the description itself is not intended to necessarily limit the scope of claims. Rather, the claimed subject matter might be embodied in other ways or to include different steps similar to the ones described in this document, in conjunction with other present or future technologies. Terms should not be interpreted as implying any particular order among or between various steps herein disclosed unless and except when the order of individual steps is explicitly described.

Embodiments of the invention include, among other things, an improved vibrato component for a stringed instrument. Aspects of this invention are an improvement over existing technology for stringed instruments, such as the technology described in U.S. Pat. No. 2,972,923 and depicted in the example of FIG. 1. In further aspects, the invention is directed to an optimized vibrato tailpiece mechanism and a method of implementing the optimized vibrato tailpiece mechanism in a stringed instrument. Embodiments of the invention address the need for greater downward tension as an instrument's strings pass over the bridge saddles 92 toward the tailpiece.

Figure 1:
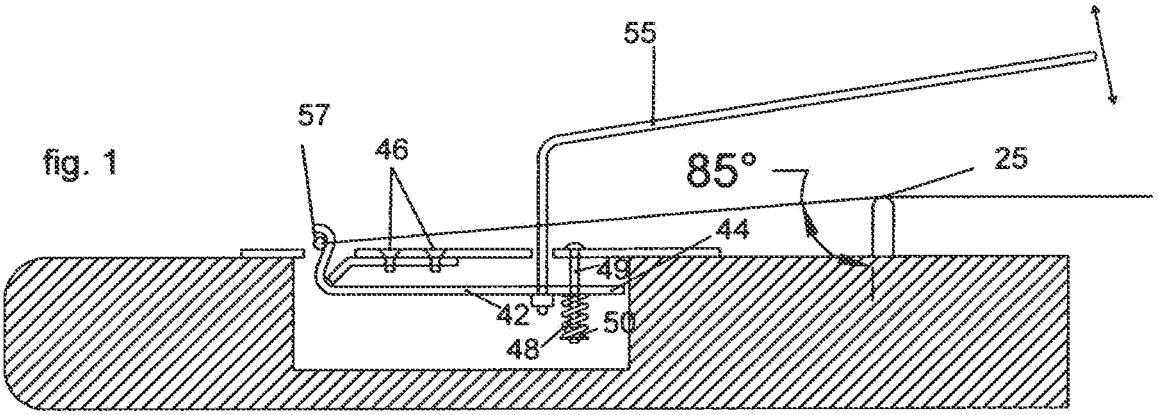
FIG. 1 represents a cross section of the design disclosed in U.S. Pat. No. 2,972,923.

Referring first to FIG. 1 of the drawings, the invention is incorporated in a guitar having a body 10, a neck 11 and a head 12. The guitar is a solid-body type, having a top surface 13 that may include a finger board or face plate mounted thereon. Other conventional components include an electromagnetic pickup, and suitable tone and volume controls adapted to control the characteristics of the electrical signal generated by the pickup in response to vibration of the strings 14-19.

The guitar strings 14-19 are extended in tensioned relationship between tuning screws (on head 12) and the improved vibrato device 20 of the present invention. The arrangement is such that the strings lie generally in a single plane generally parallel to the top surface of the guitar body 13. The improved vibrato device 20 is mounted rearward of and in pivotal relation to a bridge 25 mounted to the top surface 13 of guitar body 10 as will be described hereinafter. The improved vibrato device further provides for selective depth adjustability in relation to the top surface of guitar body 10, which in turn provides for adjustability of the string angle for strings 14-19 between the bridge and the attachment to the string plate.

The improved vibrato device 20 comprises (1) a metal top or base plate 22 rigidly anchored, as by screws, to the guitar body 10, (2) a fulcrum plate 24 removably attached to base plate 22 and (3) a string plate 30 pivotally mounted to the base plate 22 to pivot about a portion of the fulcrum plate 22.

Figure 2:
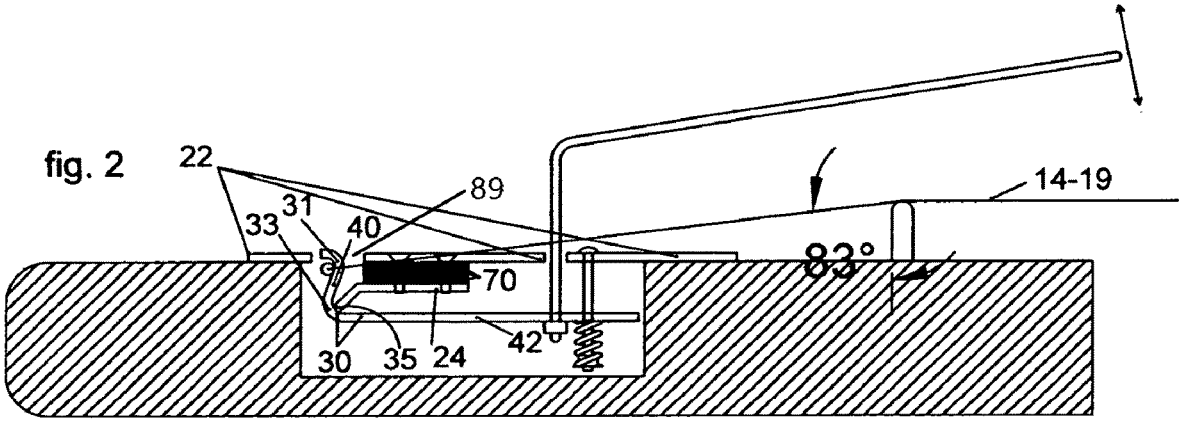
FIG. 2 depicts a cross section of the vibrato apparatus in accordance with one aspect of the present invention.

The fulcrum plate is mounted, such as by screws 46, beneath base plate 22 in relation to the plane of the top surface of the guitar body, as shown in FIG. 1. The string plate 30 is pivotally mounted to the base plate 22 of the vibrato device to provide for pivotal movement of the string plate about the fulcrum plate 24 and relative to the base plate. [Openings 24] *As seen in FIGS. 2 and 5, opening 89 is provided in base plate 22 to receive at least a portion of string plate 30 therein and to allow the string plate 30 to pivot about fulcrum plate 24. As seen in FIG. 5, slots 90* are provided in base plate 22 [along a line transverse (preferably perpendicular) to the guitar strings to allow the string plate 30 to pivot about file rum plate 24. The openings are preferably slots formed in the base plate.] *and connect to and extend from opening 89 to accommodate the strings 14-19 as discussed in more detail below.*

The string plate 30 comprises a string attachment portion 40 and a lever arm portion 42. The string attachment portion 40 extends generally transversely (preferably perpendicularly) to the strings 14-19 and extends vertically into the guitar body such that it has a proximal portion 31 extending from generally the top surface 13 to a distal portion 33 below the top surface as shown in FIG. 2. The string attachment portion is preferably sinusoidally shaped—i.e., a reverse S-shape—as shown in FIG. 2. String tension pulls the distal portion 33 against the fulcrum plate at a bent end 35 of the fulcrum plate. The lever arm portion 42 is preferably integral formed with the string attachment portion 40 at its distal portion and extends longitudinally underneath the base plate a distance towards bridge 25, as shown in FIG. 1. The distal end 44 of lever arm 42 is movably attached to the base plate through a screw 49 that extends through both the base plate 22 and the lever arm portion 42 of the string plate 30. A spring 48 is held in place by screw 49 between a threaded brass cup 50 mounted at the end of the screw and the underneath portion of the lever arm portion 42. Spring 48 biases the lever arm against the pull of the tensioned strings such that the lever arm sits generally parallel to the strings unless the vibrato arm is used as will be described in greater detail below.

A vibrato arm [55] *59* is rigidly mounted to the lever arm 42 of the string attachment plate at a distal end of the lever arm 42. As a user of the instrument pushes down or pulls up on the vibrato arm [55] *59*, the lever arm portion 42 of string plate 30 is likewise pushed down or raised thereby pivoting the string plate about the fulcrum plate. This movement changes the pitch of the strings and creates a vibrato effect.

Figure 6:
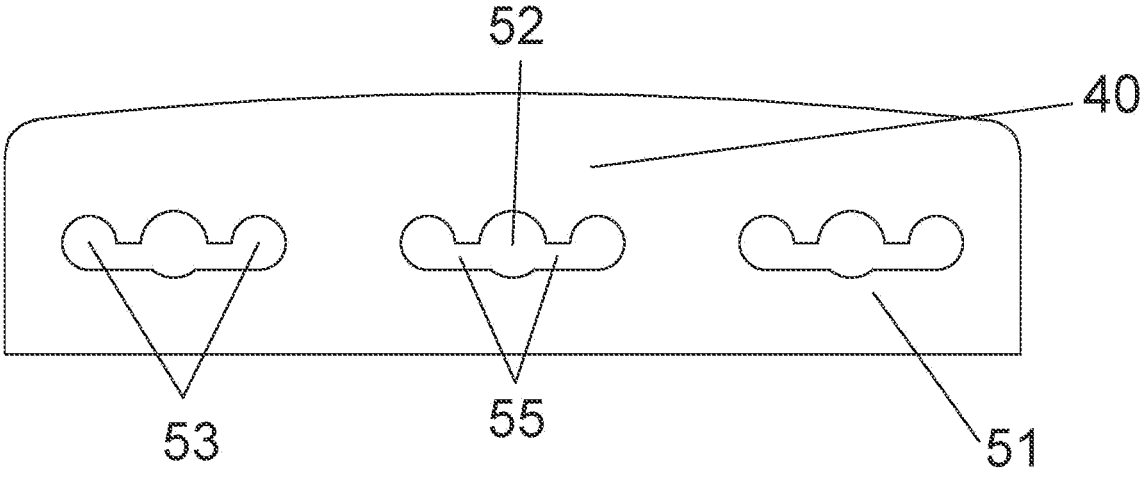
FIG. 6 depicts a string plate of the present invention.
Figure 8A:
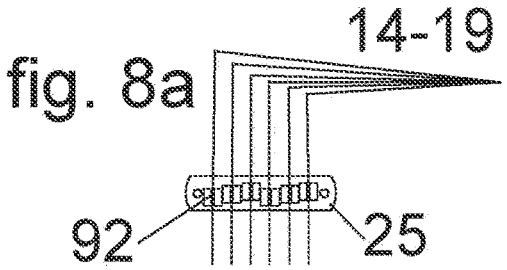
FIG. 8A illustrates a top plan view of a bridge showing the bridge saddles of the guitar of FIG. 8.
Figure 8:
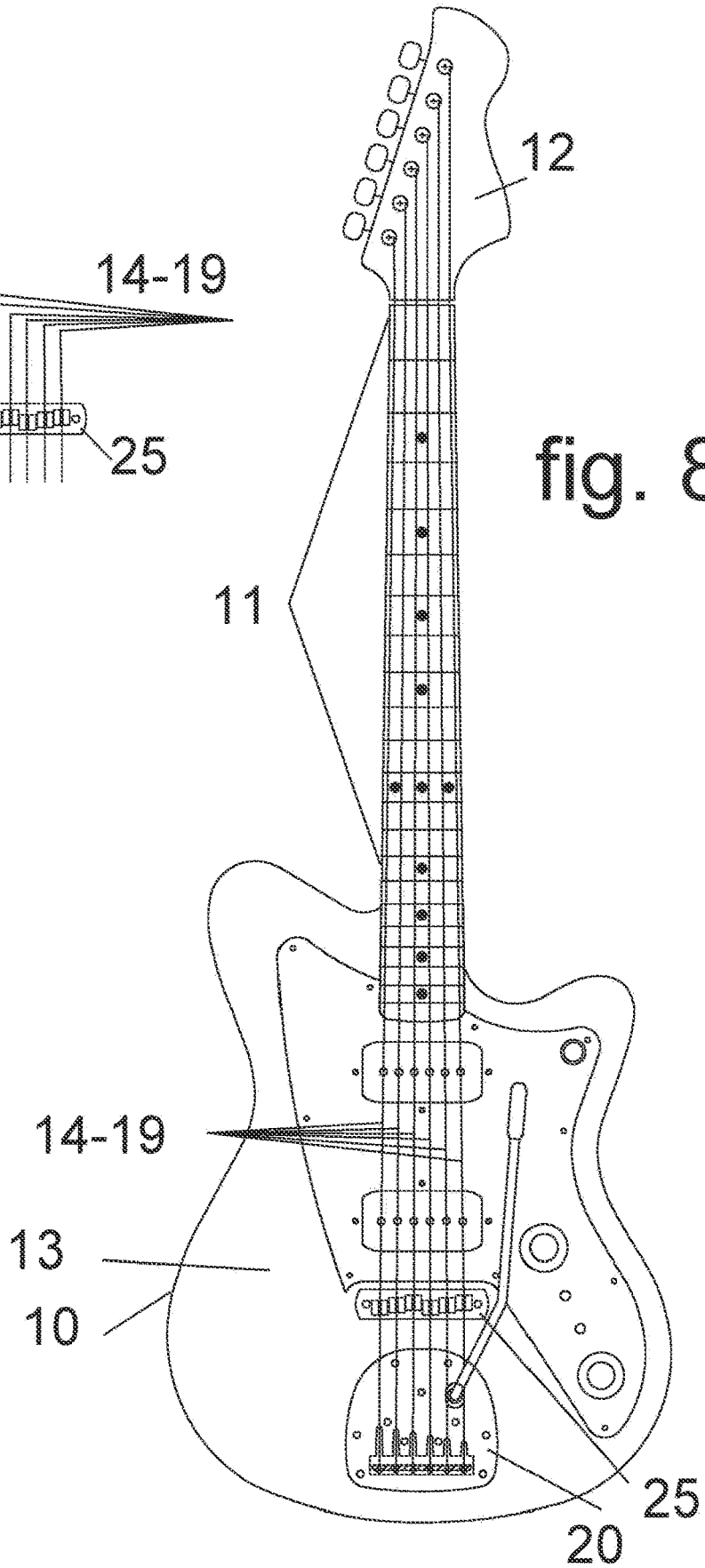
FIG. 8 illustrates a top plan view of a guitar having the vibrato apparatus of the present invention.

With the present invention and unlike previous instruments of this type, the proximal end of the string attachment portion of the string arm may sit at or even below the top surface of the guitar body depending on the user's preference. This creates an issue with replacing guitar strings. It is not desirable to have to remove the unit to effectuate string replacement through traditional means—i.e., inserting the string from rearward of the string attachment portion and pulling the string through until a ball at the end of the string engages the string attachment portion. Given the potential location of the string attachment portion at or below the surface of the instrument, the string attachment portion 40 of the present invention includes a front-loading feature. As shown in FIG. 6, the string attachment portion 40 comprises one or more string openings 51. Each string opening 51 comprises an access hole 52, one or more string anchor apertures 53, and one or more slots 55 connecting the access hole 52 to each string anchor aperture 53. Preferably the string attachment portion includes three openings 51 with each opening 51 having two string anchor apertures 53, as shown in FIG. 6. Access hole 52 of each opening 51 is formed and configured to accept the string ball 57 of each string 14-19 from the side of the string attachment portion facing the bridge. Each string anchor aperture 53 is sized and configured to be smaller than the diameter of the string ball to capture the string ball behind the string attachment portion 40 once the guitar string is moved into the string anchor aperture. Slots 55 connect the access opening 51 to each anchor aperture 53. The slots are sized and configured to receive the string therethrough but are smaller than the ball of the guitar string.

As such, the ball end of each string can be inserted from the top surface of the stringed instrument and from the bridge side of the guitar body through access hole 52 in the string attachment portion 40 of the string plate 30. The string is then laterally moved through the slot 55 to the desired string anchor aperture 53 and anchored therein to locate the string in the string line path for each individual string.

In some aspects of the present invention, the string plate 30 and fulcrum plate 24 may be selectively lowered relative to base plate 22. Lowering the string plate 30 lowers the string attachment portion 40 relative to the top of the bridge as can be seen by comparing FIGS. 1 and 2. This change in position makes the string angle between the ball end of 57 each string 14-19 and the bridge more acute and thereby makes it more difficult for the string to be dislodged from the bridge. For example, in FIG. 1, the bridge angle is shown to be approximately 85 degrees. By inserting shims, this angle changes to approximately 83 degrees. These angles are simply for exemplary purposes only as they are dependent on a player's preferred set up. The degree of downward pressure exerted by the strings on the bridge is thus adjustable by the user of the instrument.

To accomplish this, the improved vibrato mechanism 20 is designed to allow one or more plates 70 or wedges 82 to be selectively inserted between the base plate 22 and the fulcrum plate 24. This thus increases the space between the fulcrum plate 24 and the base plate 22. The screw attaching the distal end of the lever arm of the string attachment plate may be loosened to allow for the string plate to move downwardly into the guitar per the user's desired tension of the string.

One embodiment of the invention is detailed in the mechanism and method of FIG. 2, which details the adjustment of depth of the string bar relative to the base plate 22 through mounting shims [70] *75* ([FIG.] *FIGS. 4 and* 5) between the underside of the base plate 22 and the fulcrum plate 24. The fulcrum plate in turn forces the string plate downwardly and more internally of the guitar body. With each added shim [70] *75*, the depth of the string plate 30 is more internal of the guitar body and the string angle to the bridge becomes more acute, and thereby increases the downward pressure on the bridge. This downward pressure holds the string tight to the bridge. Multiple stacked shims allow the user to determine the amount of downward pressure that best fits the user's playing style, according to various aspects of the invention.

Additionally, one or more slots 90 may be formed in the base plate 22 along each string line so that as the string plate is lowered by adding additional shims, the strings 14-19 may pass through the plane of the base plate 22 without interference, according to embodiments of the invention. In further aspects, a plurality of slots may be cut into the base plate 22 along each string line such that each slot corresponds to a particular string, and as the string plate lowers, the strings may pass through the plane of the top without interference.

Figure 3A:
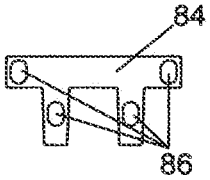
FIG. 3A depicts a wedge for use with the vibrato apparatus in accordance with the second aspect of the invention.
Figure 3:
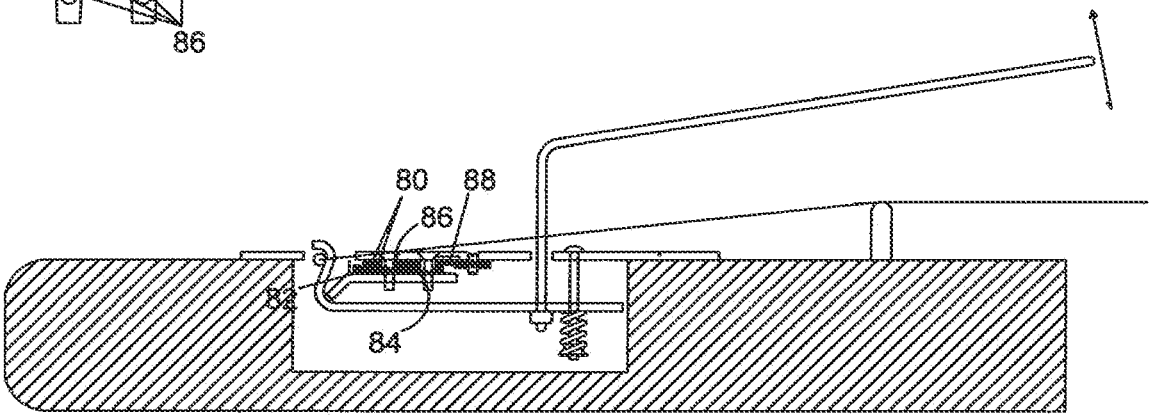
FIG. 3 depicts a cross section of the vibrato apparatus in accordance with a second aspect of the invention.

Referring next to FIG. 3, the optimized vibrato tailpiece mechanism 20 of the present invention is depicted and an alternative mechanism to lower the vibrato apparatus is shown. In this embodiment, two opposed wedge-shaped blocks 80 mounted between the base plate 22 and the fulcrum plate 24 is shown according to embodiments of the invention. The bottom wedge 82 is secured to the fulcrum plate. The top wedge 84 has a clearance slot 86 to allow it to slide back and forth along the path of the fulcrum plate mounting screws. One or more rods 88 are threadably received through an anchor block secured to the underside of the base plate 22. As the threaded rod 88 is turned, it is configured to push against the top wedge 84 moving it laterally toward the rear of the guitar body. The wedge shape forces the bottom wedge to be pushed downwardly thus lowering the fulcrum plate 24 and the string plate 30.

As shown in FIG. 5, embodiments of the base plate 22 have wide slots 90 formed therein along each of the instrument's string paths. This allows a portion of the guitar strings 14-19 to be lowered beneath the plane of the base plate 22 as shown in FIG. 2 to achieve the desired downward pressure at the bridge. These slots 90 allows the strings to extend to the bridge saddles 92 on bridge 25 without risk of rubbing against the base plate 22. In some aspects of the invention, with the increased downward pressure at the bridge, the strings 14-19 can resist the force of aggressive playing and each string stays firmly seated in their respective bridge saddle 92. The bridge 25 will have less sympathetic vibration and, with less dissipation of string energy at the bridge, the strings are configured to sustain longer when plucked.

FIG. 7 depicts an improvement on the original design's vibrato arm housing. The improved vibrato arm housing [70] *77* comprises a socket 71 for receiving the proximal end 73 of the vibrato arm [55] *59*, a threaded channel 72 that extends generally parallel to the proximal end 73 of the vibrato arm [55] *59*, a second side channel 74 that is generally transverse to threaded channel 72, a cone point screw 76 threadably received in the threaded channel 72 and a bearing 78 received in side channel 72. When screw 76 is tightened, it presses against bearing 78 in the side drilled channel 74 to force the bearing against the proximal end 73 of the vibrato arm [55] *59*. Preferably, the [distal end] *proximal end 76* of the vibrato arm *59* is formed with a groove 81 around the periphery of the arm to receive a portion of the bearing 78. Thus, tightening the screw provides resistance to the spinning of the vibrato arm in its socket 71. In addition, the base plate 22 is formed with an aperture 83 to enable a user to access and selectively tighten or loosen the cone point screw 76 from outside of the instrument body. This improved design of the housing [70] *77* enables the user to select whether the vibrato arm *59* swings freely or is set at a particular location.

In various aspects of the invention, lowering the vibrato assembly addresses the many issues of the original design without changing the way the vibrato arm feels as the user engages it. Accordingly, the optimized vibrato tailpiece mechanism and method of implementing the optimized vibrato tailpiece mechanism in a stringed instrument maintains the integrity of the original design's straight string path from the string plate to the bridge. In further aspects, the optimized vibrato tailpiece mechanism and a method of implementing the optimized vibrato tailpiece mechanism in a stringed instrument also allows the user to continue to pluck and strum in the area behind the bridge if so desired.

In another embodiment, the shim component could be tapered to tilt the string plate lower in the back, thus creating a steeper angle of the string path to the bridge saddle.

In one aspect, the shim feature could be milled together with the fulcrum plate, thus forming a single component.

In another embodiment, the base plate 22 could have recessed slots for the strings to pass through at a steeper angle without being cut entirely through the base plate 22.

In another embodiment the base plate 22 could have a recessed inner area of which the entire vibrato system is mounted to its underside while allowing the mounting section of the base plate to the instrument to be flush with the top of the instrument's body.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility and may be employed without reference to other features and subcombinations and are contemplated within the scope of the claims.

The invention claimed is:

1. A vibrato tailpiece for a stringed instrument having a bridge *and a plurality of strings*, wherein the vibrato tailpiece comprises a base plate, a fulcrum plate [adjustably] mounted beneath the base plate, and a string attachment plate [pivotally] connected at a distal end of the string attachment plate to the base plate so that at least a portion of the string attachment plate is underneath the fulcrum plate for pivoting about the fulcrum plate, [the fulcrum plate being selective adjustable downwardly relative to the base plate to force the string attachment plate downward to a lower position] *the base plate including an opening and a plurality of slots, the opening being configured to receive at least a portion of the string attachment plate therein, the plurality of slots being connected to and extending from the opening, the plurality of slots being configured to receive the strings and enable the strings to move downwardly beneath the base plate*.

2. The vibrato tailpiece of claim 1, wherein the string attachment plate comprises a string attachment portion for receiving [one or more strings of the stringed instrument] *the strings* and a lever arm portion having the distal end [portion], the lever arm portion being biased against a spring to enable pivoting of the string attachment plate about the fulcrum plate.

3. The vibrato tailpiece of claim 2, wherein the string attachment portion extends generally perpendicularly from the lever arm *portion* and includes an access hole configured to receive a ball end of [a string of the stringed instrument] *one of the strings* and one or more string anchor apertures for receiving and holding [one or more strings of the stringed instrument] *one of the strings*.

4. The vibrato tailpiece of claim 1 further comprising one or more plates that are mounted between the fulcrum plate and the base plate to force the fulcrum plate and string attachment plate downwardly relative to the base plate.

5. The vibrato tailpiece of claim 1 further comprising a top wedge and an opposed bottom wedge, the top wedge being slidable relative to the bottom wedge such that [as a deep end of the top wedge is moved over the bottom wedge,] the fulcrum plate and the string attachment plate are moved [downwardly] relative to *the* base plate.

[6. The vibrato tailpiece of claim 2, wherein the base plate includes one or more slots to receive the strings and being operably configured to enable the strings to move downwardly beneath the base plate.]

7. The vibrato tailpiece of claim 2 further comprising a vibrato arm mounted to the lever arm *portion* of the string attachment plate, the vibrato arm comprising a proximal end and a housing configured for rotatable mounting of the proximal end of the vibrato arm to the string attachment plate, the housing comprising *a socket for receiving the proximal end of the vibrato arm, a threaded bore extending substantially parallel to the socket,* a set screw received in [a]*the* threaded bore, *a bore transverse to the threaded bore, and a bearing positioned in the bore,* the set screw engaging [a] *the* bearing [positioned in a bore transverse to the threaded bore], *the base plate further including an aperture,* the set screw selectively tightenable *via the aperture* to press the bearing against the vibrato arm to secure the vibrato arm.

8. The vibrato tailpiece of claim 7 wherein the [distal end] *proximal end* of the vibrato arm further comprises a groove for receiving a portion of the bearing.

[9. The vibrato tailpiece of claim 7 wherein the set screw is accessible through an aperture formed in the base plate of the vibrato tailpiece.]

10. A vibrato mechanism for a stringed instrument having one or more strings, a bridge, and a vibrato tailpiece comprising a base plate *including an aperture*, a fulcrum plate [adjustably] mounted beneath the base plate, and a string attachment plate [pivotally] connected [at a distal end of the string attachment plate] to the base plate so that at least a portion of the string attachment plate is underneath the fulcrum plate for pivoting about the fulcrum plate, the vibrato mechanism comprising a vibrato arm and an arm housing, the arm housing configured for rotatable mounting of a proximal end of the vibrato arm to the string attachment plate, the *arm* housing comprising *a socket for receiving the proximal end of the vibrato arm, a threaded bore extending substantially parallel to the socket,* a set screw received in [a] *the* threaded bore [extending substantially parallel to the proximal end of the vibrato arm], *a bore transverse to the threaded bore, and a bearing positioned in the bore,* the set screw engaging [a] *the* bearing [positioned in a bore transverse to the threaded bore, the set screw] *and* being operably configured to be [selectively] tightenable through [an] *the* aperture in the base plate of the stringed instrument to press the bearing against the vibrato arm to secure the vibrato arm.

11. A method for selectively increasing downward pressure of one or more strings of a stringed instrument against a bridge of the stringed instrument, wherein the method comprises the steps of:

attaching a vibrato tailpiece to a stringed instrument, the vibrato comprising a base plate, a fulcrum plate adjustably mounted beneath the base plate, and a string attachment plate pivotally connected at a distal end of the string attachment plate to the base plate so that at least a portion of the string attachment plate is underneath the fulcrum plate for pivoting about the fulcrum plate; and lowering the string attachment plate relative to the base plate, [wherein the base plate is formed with one or more slots to allow one or more strings of the stringed instrument to pass below the base plate to the string attachment plate that has been lowered beneath the plane of the slotted base plate]*wherein the base plate includes an opening and a plurality of slots, the opening being configured to receive at least a portion of the string attachment plate therein, the plurality of slots being connected to and extending from the opening, the plurality of slots being configured to receive the strings and enable the strings to move downwardly beneath the base plate*.

12. The method of claim 11 [wherein the base plate further includes a slot to access the string attachment plate and] wherein the method further includes the steps of:

installing a string of the one or more strings having a string ball at one end by threading the string ball through an access port of the string attachment plate from the side of the string attachment plate facing the bridge of the instrument *via the opening*;

moving the string laterally through a slot formed in the string attachment plate to an anchor aperture; *and* anchoring the string to the string attachment plate.

13. The method of claim 12 wherein the step of threading a string ball through an access port is done through a top surface of the stringed instrument with the string attachment plate being beneath the top surface.

*14. A vibrato tailpiece for a stringed instrument having a bridge, wherein the vibrato tailpiece comprises:*

*a base plate;*

*a fulcrum plate mounted beneath the base plate; and*

*a string attachment plate connected to the base plate so that at least a portion of the string attachment plate is underneath the fulcrum plate for pivoting about the fulcrum plate,*

*the string attachment plate comprising a string attachment portion for receiving one or more strings of the string instrument and configured such that at least a portion of the one or more strings can be lowered below the base plate when the vibrato tailpiece is attached to the stringed instrument,*

*wherein the base plate includes an opening and a plurality of slots, the opening being configured to receive at least a portion of the string attachment plate therein, the plurality of slots being connected to and extending from the opening, the plurality of slots being configured to receive the strings and enable the at least a portion of the one or more strings to move downwardly beneath the base plate.*

*15. The vibrato tailpiece of claim 14, wherein the fulcrum plate is adjustable downwardly relative to the base plate to force the string attachment plate downward to a lower position.*

*16. A method for selectively increasing downward pressure of one or more strings of a stringed instrument against a bridge of the stringed instrument, wherein the method comprises the steps of:*

*attaching the vibrato tailpiece of claim 14 to a stringed instrument; and*

*lowering the string attachment plate relative to the base plate such that at least a portion of the one or more strings extends below the base plate.*

*17. The method of claim 16, wherein the method further includes the steps of:*

*installing a string of the one or more strings having a string ball at one end by threading the string ball through an access port of the string attachment plate from the side of the string attachment plate facing the bridge of the instrument;*

*moving the string through a slot formed in the string attachment plate to an anchor aperture; and*

*anchoring the string to the string attachment plate.*

* * * * *